United States Patent [19]

Egan et al.

[11] Patent Number: 5,603,600

[45] Date of Patent: Feb. 18, 1997

[54] TELESCOPING PERSONAL WATERCRAFT JET TRACK

[76] Inventors: Gordon Egan, P.O. Box 2830, Idaho Falls, Id. 83403-2830; Bob Harris, Jr., P.O. Box 605, Ririe, Id. 83443

[21] Appl. No.: 369,694

[22] Filed: Jan. 6, 1995

[51] Int. Cl.$^6$ ..................................... B60P 9/00
[52] U.S. Cl. ................. 414/462; 414/478; 414/477; 414/538; 280/414.1
[58] Field of Search ..................... 414/462, 477, 414/478, 479, 537, 539, 538; 254/3 R; 280/414.1

[56] References Cited

U.S. PATENT DOCUMENTS

| | | | |
|---|---|---|---|
| 2,830,717 | 4/1958 | Posey | 414/479 |
| 3,011,670 | 12/1961 | Chatterton et al. | 414/479 |
| 3,056,520 | 10/1962 | Rutigliano | 414/479 |
| 3,199,695 | 8/1965 | Scofield, Jr. | 414/479 |
| 3,550,800 | 12/1970 | Robinson | 214/450 |
| 3,726,423 | 4/1973 | Miron | 214/505 |
| 3,734,321 | 5/1973 | Long et al. | 214/450 |
| 3,927,779 | 12/1975 | Johnson | 414/538 |
| 3,972,433 | 8/1976 | Reed | 214/450 |
| 4,050,595 | 9/1977 | Bussard | 280/414.1 |
| 4,109,809 | 8/1978 | Clark | 214/505 |
| 4,212,580 | 7/1980 | Fluck | 414/522 |
| 4,234,285 | 11/1980 | Martinez | 414/462 |
| 4,274,788 | 6/1981 | Sutton | 414/462 |
| 4,950,123 | 8/1990 | Brockhaus | 414/462 |
| 4,960,356 | 10/1990 | Wrenn | 280/414.1 |
| 5,108,248 | 4/1992 | Murrill | 414/462 |
| 5,184,913 | 2/1993 | Meriwether | 280/414.1 |
| 5,232,329 | 8/1993 | Livingston | 414/462 |
| 5,249,910 | 10/1993 | Ball | 414/462 |
| 5,281,075 | 1/1994 | Tatman et al. | 414/538 |
| 5,380,141 | 1/1995 | Flowers | 414/462 |

*Primary Examiner*—David A. Bucci
*Assistant Examiner*—Douglas Hess
*Attorney, Agent, or Firm*—Aquilino & Welsh

[57] ABSTRACT

An apparatus for loading and unloading a personal water craft into the bed of a conventional pick-up truck which only requires a single operator. The device includes a support frame mountable to the bed of a pick-up truck which supports at least one telescopic, pivotal ramp assembly. The ramp assembly including first and second sections which are telescoped together so as to extend and form an elongated ramp. The first ramp section is pivotally secured at its rear to the rear of the support frame by a hinge assembly. The hinge assembly allows the first and second sections to pivot together and also functions to guide the second ramp section as it slides along a channel in the length of the first ramp section. In operation the personal water craft or personal watercraft is secured at its bow to a winch cable and pulled on a sled on the second ramp section, once on the sled the second ramp section travels along the first ramp section while the weight of the personal watercraft causes the ramp assembly to pivot downward until it lies in a horizontal plane.

9 Claims, 3 Drawing Sheets

TELESCOPING PERSONAL WATERCRAFT JET TRACK

BACKGROUND OF THE INVENTION

1. Field of the Invention

The present invention relates to a telescopic, pivotal frame structure for loading, unloading and transporting a personal water craft in the bed of a pick-up truck or onto a variety of transporting means.

2. Description of the Prior Art

Since personal water crafts are most often operated by a single user and due to the fast growing popularity of the sport a demand has been created for an apparatus which will easily allow a personal watercraft to be loaded and unloaded from a vehicle by a single person.

Although other inventions, such as that disclosed in U.S. Pat. No. 5,249,910 to Ball, have addressed this problem these devices have not met with great commercial success. The Ball patent for example does not allow the tailgate of the pick up truck to close in order to enclose the personal water craft and apparatus within the bed. Containing the craft and apparatus within the bed provides security that the craft will not be lost during transport. Further, the Ball patent fails to teach a telescoping ramp, nor a ramp which pivots when loading or unloading.

U.S. Pat. No. 3,550,800 to Robinson teaches a ramp for loading a boat which telescopes, however, the ramp does not pivot, nor is it self contained within the bed of a pick-up truck.

U.S. Pat. No. 3,726,423 to Miron shows a pick-up mounted ramp which can pivot, but does not include telescoping ramp sections. Further this device interferes with the tailgate of the truck during operation.

SUMMARY OF THE INVENTION

A device for loading, unloading and transporting a personal water craft in a bed of a pick-up truck or other such transporting means, such as a house boat, which includes a support frame securable to the bed of a pick-up truck including a front end, a rear end approximate the rear of the pick-up truck bed and a horizontal upper surface. A ramp assembly mounted to the upper horizontal surface of the support frame includes a first ramp member which cooperates with a second ramp member. The first ramp member having a rear end pivotally attached to the support frame at the rear end thereof and extending forward toward said front end of said support frame. The second ramp member is telescopically secured to said first ramp member so as to travel along the length of said first ramp member while pivoting with the first ramp member. The second ramp member has a sled rigidly mounted to the upper surface thereof for receiving a personal water craft thereon and an upstanding bow stop mounted at the front end thereof. The sled includes a pair of spaced rails secured together by crossbars.

It is an object of the present invention to provide a loading and unloading ramp assembly for a personal water craft which is fully contained within the bed of a pick-up truck.

Another object of the invention is to provide a loading and unloading ramp assembly for personal water craft which can be operated by a single user and requires no lifting by the user.

Still another object of the invention is to provide an assembly which does interfere with the tailgate of a pick-up truck.

Yet another object of the invention is provide an apparatus having a ramp structure which is hinged together so as to have sections which slide along one another and also pivot with each other.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
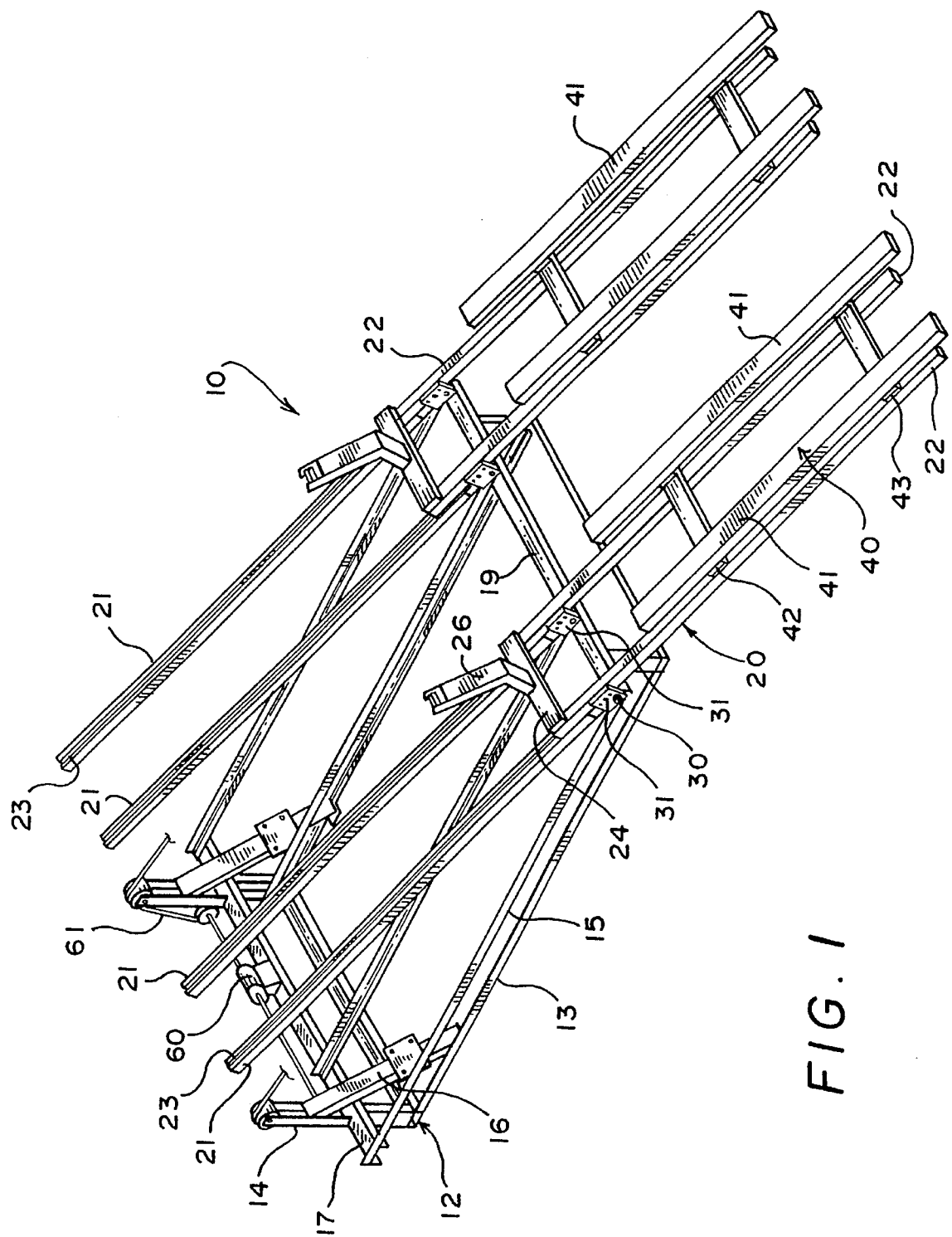
FIG. 1 is a side perspective view of the present invention in a ready to load position with the ramp fully extended.
Figure 2:
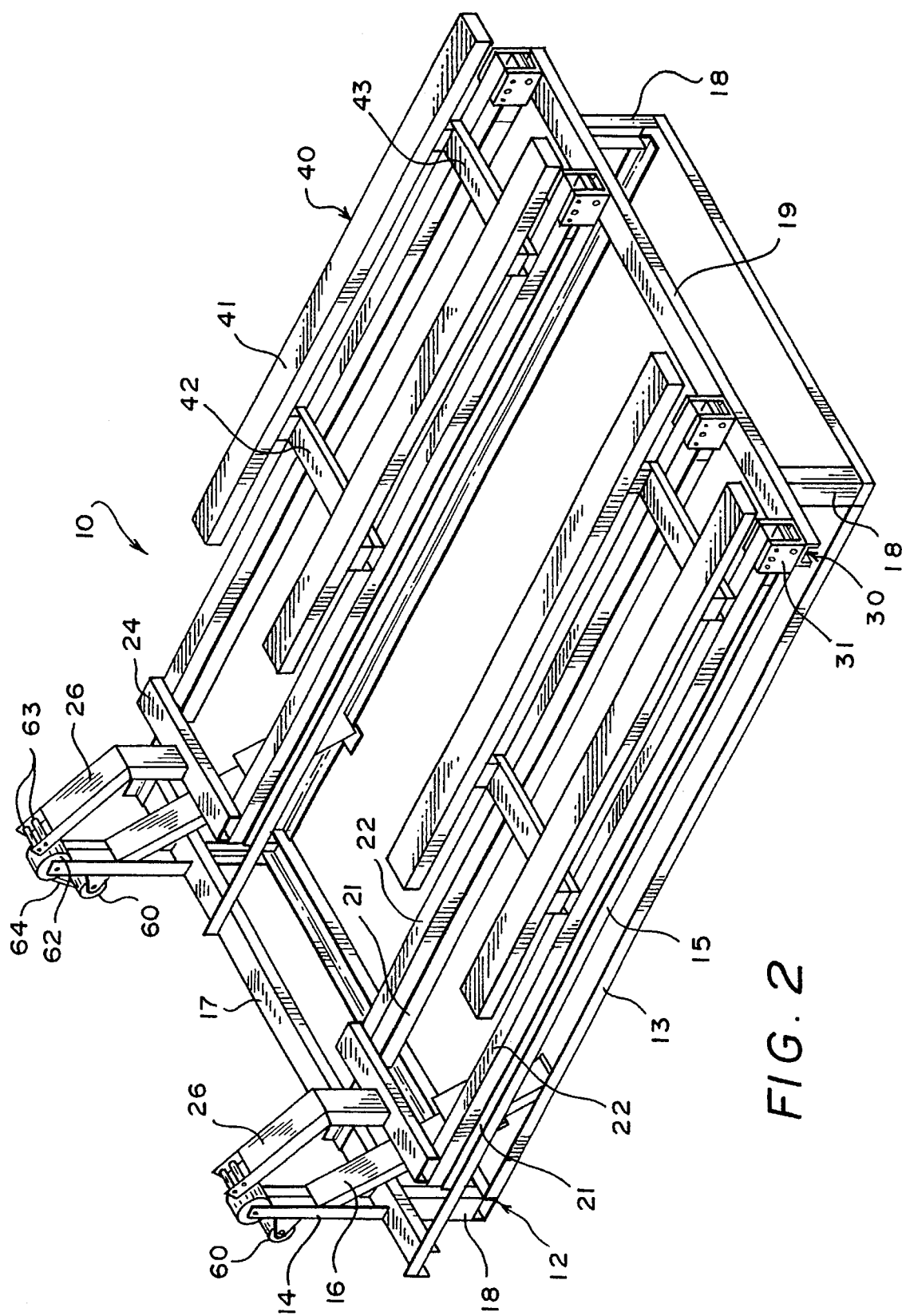
FIG. 2 is a side perspective view of the invention in the transporting position with the fully ramp contracted.
Figure 3:
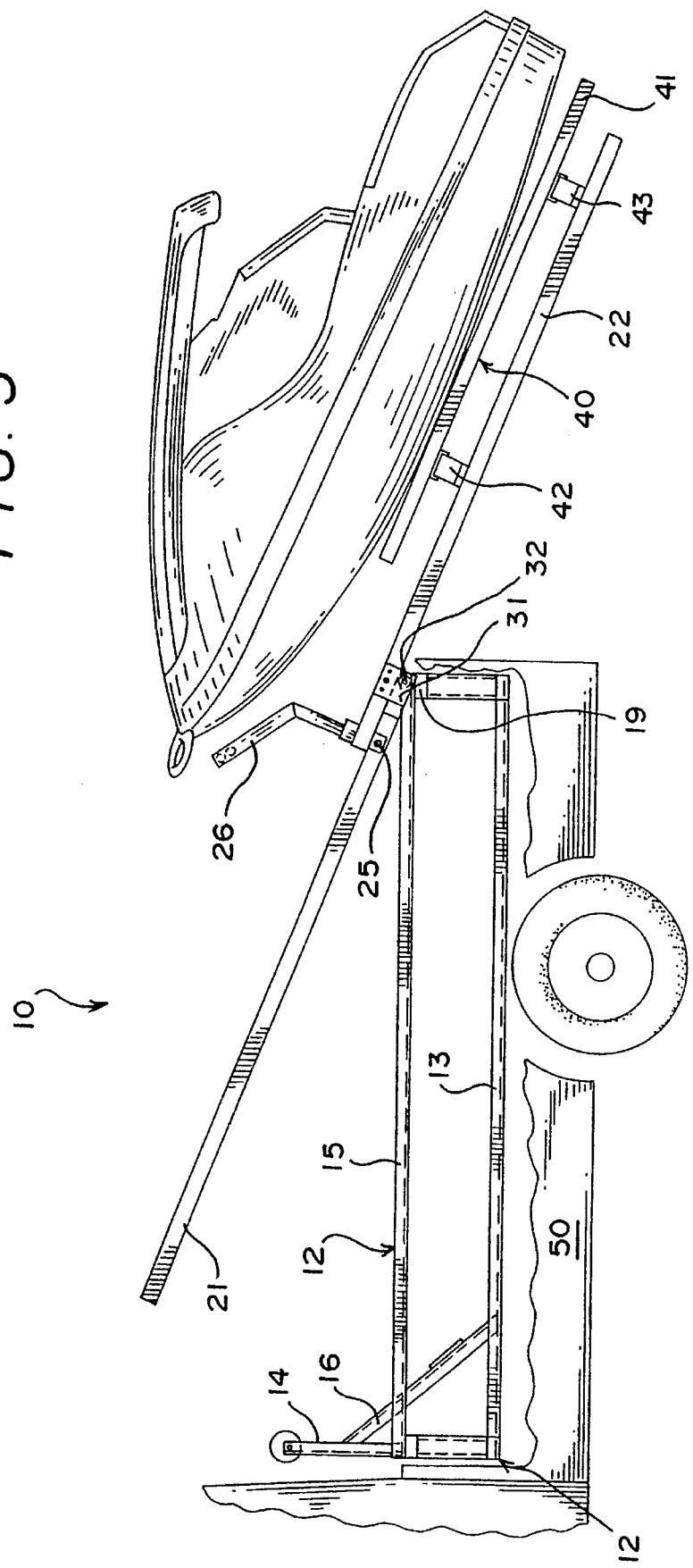
FIG. 3 is a side view of the invention shown mounted in a vehicle with a personal water craft being loaded.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Turning to the drawings the preferred embodiment of the present invention 10 is shown mounted in the bed of a pick-up truck 50. The apparatus 10 includes a support frame 12 and a ramp assembly 20. The support frame 12 and ramp assembly may be made from various materials such as steel or a metal alloy. Support frame 12 is generally rectangular and dimensioned so as to fit within the bed of a pick-up truck. Support frame 12 includes a lower structural frame 13 and an upper structural frame 15 which are spaced from each other by a plurality of post 18. At the front of support frame 12 is a pair of bow stops 14 which extend upwardly from crossbar 17. Bow stops 14 are secured to lower frame 13 by way of angled bars 16 which not only function to reinforce the connection of the bow stops 14 to crossbar 17, but also function to stop the travel of the ramp assembly 20 as the personal water craft is being loaded. Angled reinforcing bars 16 are located in the path of the ramp assembly 20 and thus prevent forward movement of the ramp when contacted by a crossbar 24 which is part of the ramp assembly supporting the sled upon which the personal water craft is positioned.

Ramp assembly 20 includes a first ramp member 21 which functions together with a second ramp member 22 to form a telescopic, pivotal ramp. In the preferred embodiment a pair of first ramp members 21 cooperate with a pair of second ramp members 22 to form a rigid ramp assembly. The apparatus 10 as depicted can include two side by side loading ramp assemblies if it is desired to transport two personal watercrafts. For purposes of discussion only one ramp assembly will be described as they are identical. First ramp members 21 are formed from a channel with a longitudinal slot 23 facing upward. First ramp members 21 are secured at their rear end to rear crossbar 19 of the upper support frame 15 by a hinge means 30. If required a pair of first ramp members 21 may be secured together approximate their front end in order to provide additional strength.

Hinge means 30 secures the rear of first ramp members 21 to rear crossbar 19 so as to create an extremely durable pivotal connection. Hinge means 30 includes side walls 31 which function to guide second ramp members 22 along the length of the first ramp member 21 they are associated with. In other words, hinge means 30 prevents sideward movement of the second ramp members 22 as they are slid along the length of respective first ramp members.

Second ramp members 22 include downward projecting guide means in the form of wheels 25. Each second ramp member having a pair of wheels 25 secured thereto which extend through slot 23 and are received within the channel of a respective first ramp member. The wheels allow the second ramp members to freely travel along the length of the first ramp members. A pair of second ramp members are secured together by a front crossbar 24. Front crossbars 24 include an angled bow stop 26 extending upwardly therefrom. Front crossbar 24 functions to stop the forward motion of the ramp assembly 20 when loading a personal water craft.

A sled 40 for receiving the personal water craft is mounted on the upper surface of a corresponding pair of second ramp members 22. Sled 40 is formed from a pair of spaced rails 41 leaving room for the hull of the personal water craft. The spaced rails are secured together via front and rear cross bars 42 and 43, respectively. The crossbars 42,43 are rigidly secured between a pair of corresponding second ramp members 22. Sled 40 thus travels with the second ramp members 22 as they move along the length of first ramp members 21.

As mentioned above angled reinforcing bars 16 function to prevent over travel of the second ramp members 22 and thus restrict forward movement of the personal water craft during loading. Bars 16 are positioned in the path of front crossbars 24 thereby causing contact between the crossbars 24 and bars 16. Upon contact the forward movement of second ramp members 22 is halted. Any unintended further forward movement will cause crossbar 24 to ride up the angled length of the bar 16 and slowly bring the second ramp members and the personal water craft to a stop.

Mounted approximate the front of the support frame 12 is a winch system 60 which is powered via the electrical system in a vehicle in order to operate a cable 61 securable to the front of the personal water craft. Alternatively, the winch system 60 could comprise two separate winch units mounted from bow stops 14 and having a cord 64 which runs up and over roller 62 and between rollers 63 before being attached to the personal water craft.

In operation, the apparatus once bolted to the bed of a pick-up truck is fully extended as shown in FIG. 1, that is the first and second ramp sections are separated such that only the front of the second section overlies the rear of the first section and the two sections are pivoted to an angle no greater than 45 degrees from the horizontal surface of the upper support frame. The truck is then backed up towards the water until the rear tires are at the edge of the water. In this position the water craft can be aligned with the ramp, the winch cable 61 is then secured to the front of the personal water craft and the craft pulled onto sled 40 until it abuts against angled bow stop 26. The winch will then begin to pull the personal water craft, the sled 40 and second ramp members 22 along the length first ramp members 21. As second ramp members 22 slide within first ramp members 21 a greater portion of the weight of the personal water craft will cross pivot point 32 and thus will cause the first and second ramp members to automatically pivot until they are parallel with the upper horizontal surface of support frame 12. The personal watercraft is pulled towards the front of the frame 12 until cross bar 16 contacts angled reinforcing bar or until bow stop 26 contacts bow stop 17. The personal water craft is now completely contained within the perimeter of the pick-up truck bed and the tailgate can be closed to prevent any rearward sliding of the second ramp members.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A device for loading and unloading objects, comprising:
   a support frame including a front end and a rear end;
   a ramp including a first ramp member having a rear end pivotally attached to said support frame at said rear end of said support frame and extending forward toward said front end of said support frame and a second ramp member telescopically secured to said first ramp member permitting said second ramp member to travel the length of said first ramp member and to pivot therewith, said second ramp member including a bow stop projecting upwardly at a forward end of said second ramp member to limit movement of an object on said second ramp member;
   a sled rigidly mounted to and spaced above said second ramp member for receiving the object thereon; and
   a winch system mounted approximate said front end of said support frame, said winch system including a cable for attachment to the object, wherein said cable passes over at least one roller on said bow stop of said second ramp member permitting the second ramp member to be moved relative said first ramp member to facilitate loading and unloading of the object.

2. The invention as set forth in claim 1, wherein said second ramp member includes a crossbar for preventing over travel of the object when being loaded.

3. The invention as set forth in claim 1, wherein said first ramp member includes a channel and said second ramp member includes guide means secured within said channel.

4. The invention as set forth in claim 3, wherein said guide means includes a pair of spaced wheels.

5. The invention as set forth in claim 1, wherein said sled includes a pair of spaced rails secured together by at least one cross bar.

6. The invention as set forth in claim 1, further including a hinge means for pivotally securing said first ramp member to said frame and guiding said second ramp member during its travel along said first ramp member.

7. The invention as set forth in claim 1, further including a second bow stop projecting upward from the front of the support frame and an angled reinforcing bar extending downward from the second bow stop and connected to the support frame, wherein said angled reinforcing bar is positioned in a path of travel of the second ramp member to aid in preventing over travel, and said second bow stop includes a roller over which said cable of said winch system passes.

8. The invention as set forth in claim 1, wherein said support frame is dimensioned to be received within a vehicle to permit transport of an object.

9. The invention as set forth in claim 8, wherein said vehicle is a pick-up truck.

* * * * *